April 7, 1936.	J. HERMAN	2,036,332

SIGNAL DISTORTION INDICATOR

Filed Oct. 26, 1933

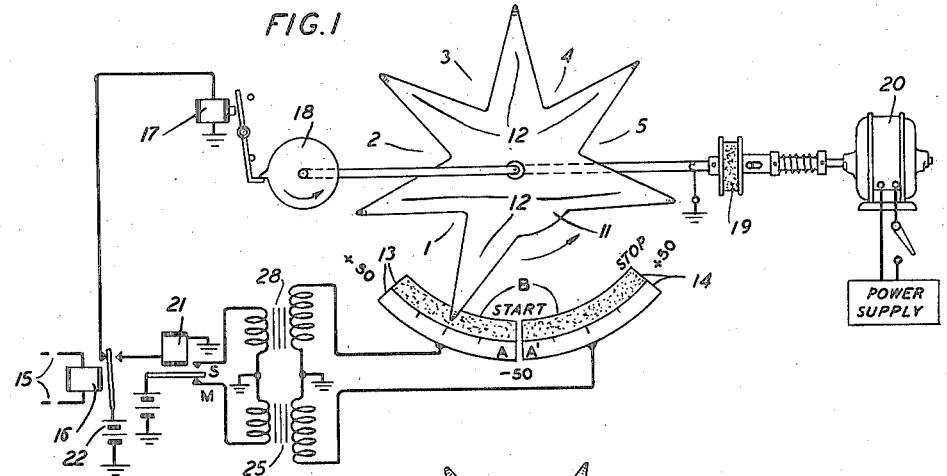

FIG. 1

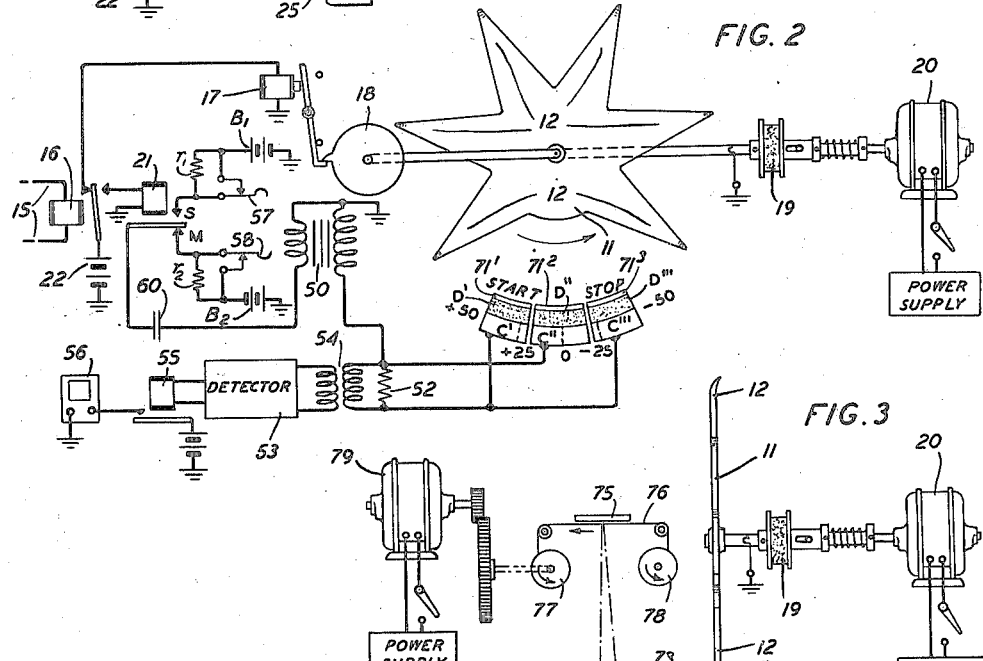

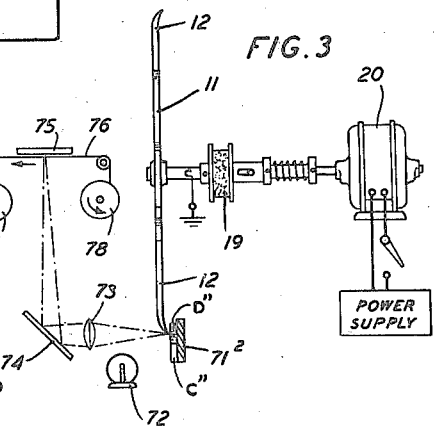

FIG. 4

| | BEGINNING OF MARK<br>A<br>20⁺0⁻20<br>10\|10 | END OF MARK<br>A'<br>20⁺0⁻20<br>10\|10 | C<br>20⁺0⁻20<br>10\|10 |
|---|---|---|---|
| ZERO DISTORTION | | | |
| 10% POSITIVE BIAS | | | |
| 10% NEGATIVE BIAS | | | |
| 10% MAX. CHARACTERISTIC OR FORTUITOUS | | | |
| 10% POS. BIAS PLUS 5% CHARACTER'C. OR FORTUITOUS | | | |
| 10% NEG. BIAS PLUS 5% CHARACTER'C. OR FORTUITOUS | | | |
| TRANSMITTER TOO FAST | | | |
| TRANSMITTER TOO SLOW | | | |

INVENTOR
J. HERMAN

BY

ATTORNEY

Patented Apr. 7, 1936

2,036,332

UNITED STATES PATENT OFFICE 2,036,332

SIGNAL DISTORTION INDICATOR

Joseph Herman, Westfield, N. J., assignor to American Telephone and Telegraph Company, a corporation of New York Application October 26, 1933, Serial No. 695,349

6 Claims. (Cl. 178—69)

This invention relates to telegraph apparatus and more particularly to apparatus for measuring signal distortion in a teletypewriter telegraph system.

An object of the invention is to obtain a visible indication of the extent of the distortion at either end of each signal impulse of a combination. More specifically stated this object is to obtain the maximum displacement of either end of each received signal impulse and thereby determine the quality of telegraph transmission over a circuit.

An important feature of the present invention is that it permits observations of signal distortion to be made with accuracy and ease on start-stop printing telegraph circuits while they are in service and without disturbing the transmission of signals over the circuits.

The distortion indicator comprises a disc which may be rotated in a manner similar to that of the brush arm of a start-stop distributor. The circumference of the disc is divided into seven sections corresponding to the seven units of the start-stop printing telegraph code, the points of division on the circumference being indicated by projections. These projections are used as the electrodes of a spark gap arrangement of which the other electrode is a segment or group of segments arranged adjacently to each other and concentrically with the disc just outside the path of rotation of the projections. The segments are provided with a scale which reads in per cent of the unit length impulse of the telegraph code. A line relay responsive to periodic signal impulses of marking and spacing character causes a high voltage at each change in the character of the signal to be impressed across the gap formed by one of the segments and the projection which happens to be passing the segment at the moment of the change. Two switching keys may be provided whereby the distortion may be indicated at either the beginning of each marking impulse or the beginning of each spacing impulse or both. Optical means may also be provided whereby spark images may be impinged on a ground glass plate or on a moving photographic film, the latter serving as a permanent record of the distortion.

The invention will be clearly understood from the following description when read in connection with the accompanying drawing of which Figure 1 shows the invention in its simplest form;

Fig. 2 is a modification of Fig. 1 and is a preferred embodiment of the invention;

Fig. 3 shows an arrangement for recording the distortion indications obtained in the arrangements shown in Figs. 1 and 2;

Fig. 4 is a chart wherein the positions of the distortion indications on the scale are shown with respect to the causes which produce the distortion.

Referring to Fig. 1, the disc 11 is arranged to rotate in a manner similar to that of the brush arm of a start-stop distributor. The disc is shown divided into seven angular sections, the points of division being indicated by projections 12 on the periphery of the disc. These sections correspond to the seven impulses comprising a signal combination of the start-stop telegraph code, namely "start", selecting impulses Nos 1, 2, 3, 4 and 5, and "stop". For reasons given hereinafter no projection is provided at the point of division between the "start" and "stop" sections. The disc is arranged to make one complete revolution for each signal combination so that the beginning or ending of each of the impulses of a signal combination may be timed by its corresponding projection passing a given reference point. In the case of the disc shown in Fig. 1 the seven sections are of equal angular length. In practice, however, each of the "start" and selecting sections are equal with respect to time to the length of a unit length impulse of the five unit telegraph code and the "stop" section approximated one and a half times the unit length impulse, the circumference, or path of rotation, of the tips of the projections 12 being selected for determining these measurements. In the usual method of transmission over teletypewriter circuits the start impulse is always a spacing signal, the stop impulse is always a marking signal, while impulses 1, 2, 3, 4 and 5 which are known as the selecting impulses, may be either marking or spacing depending upon which of the signal combinations available in the code is being transmitted.

In order that each signal combination may be correctly interpreted by the receiving mechanism of the teletypewriter, each of the five selecting impulses must remain in its proper time relationship with respect to the beginning of the start impulse. This is necessary because the receiving mechanism measures the theoretically correct time intervals from the beginning of the start impulse to the middle of each of the five selecting impulses and interprets the signal combination in accordance with the marking or spacing condition which prevails at the end of each of these time intervals. Consequently, the chances of interpreting a signal combination incorrectly, becomes greater the further the beginning or end of one or more of the selecting impulses has been displaced from its theoretically correct time of occurrence with respect to the beginning of the start impulse. The arrrangements shown in both Figs. 1 and 2 provide a means for continuously measuring such displacements and for indicating the result of each measurement in per cent of the theoretical length of each selecting impulse.

Each of the projections 12 are, in turn, used as one of the electrodes of a spark gap arrangement of which the other electrode consists of either of the two stationary segments 13 and 14. Each segment is provided with a scale, such as A and A', which reads in per cent of the dot length of an undistorted telegraph signal. Segment 13 is the electrode used in producing a spark whenever the incoming telegraph signal impulses change from spacing to marking and segment 14 is the electrode used in producing a spark whenever the incoming telegraph signal impulses change from marking to spacing.

Fixedly attached to each of segments 13 and 14 is an arcuate strip B of some suitable porous material, such as cardboard, covered with a fluorescent, or light retentive substance, such as zinc sulphite. The light retentive material may also be painted directly on the segments 13 and 14. Without the use of a fluorescent substance the values of signal distortion are indicated by means of instantaneous flashes of light on the scale. Because of the short duration of these flashes their location on the scale is somewhat difficult to read and therefore the use of a fluorescent material for retaining the position of the light flash for a period of time sufficient to obtain a reading is of a considerable advantage. It is preferable that the cardboard be placed between the electrodes of the spark gap in such a manner that the spark has to pass through both the cardboard and the coating of the fluorescent substance. In certain tests where the spark was undesirably faint, the passage of the spark through the zinc sulphite gave a very definite and prolonged indication of the spark.

In order to adjust the distortion indicating device for correct operation, the conductors 15 are first connected to a local source (not shown) of teletypewriter signals which are known to be undistorted and the stationary segments with their associated scales are oriented, if necessary, so that the sparks occur at the zero mark on the scale.

The conductors 15 may then be connected in series with any telegraph loop or line circuit, either by a switchboard jack (not shown) or any other suitable means, over which direct current teletypewriter signals are being received. In this way line relay 16 may be connected to any line circuit of which a distortion test is desired. When no telegraph signals are being received, the armature of the line relay rests on its marking, or left, contact thereby maintaining the start magnet 17 energized. The start magnet in its operated position, holds by means of cam 18 the start-stop disc 11 stationary in spite of a friction clutch 19 which tends under the influence of motor 20 to rotate the disc. The motor drives the disc 11 at a proper synchronous speed when relay 17 releases it for rotation. Relay 16 may be either of the neutral or polar type having an armature operating between two contacts so that an incoming marking signal impulse will cause the armature to rest on its marking, or left, contact and an incoming spacing signal impulse will cause it to rest on its spacing, or right, contact.

When a printer signal is being received the first impulse, known as the "start" impulse, operates relay 16 to its spacing contact. This deenergizes the start magnet 17 and thereby allows the cam 18 and the start-stop disc 11 to rotate in a direction indicated by the arrows. When the line relay armature has reached its spacing contact, the spark control relay 21 is operated by current from battery 22. As the armature of the spark control relay leaves its marking, or lower, contact, it interrupts the circuit extending through the primary winding of transformer 25, and under ordinary conditions this interruption would cause a high voltage impulse which would be produced in the secondary winding of spark coil, or transformer, 25 by the interruption, to be impressed between the segment 14 and the start-stop disc. However, no spark occurs at this time due to the fact that the projection between the "start" and "stop" division on the disc has been omitted. This has been done because of the delay which will occur between the operation of the start magnet and the operation of the spark control relay. This delay will necessitate an orientation of the distortion indicating segments from the position actually shown on the drawing, and would, therefore, cause this particular spark to give an erroneous distortion indication.

At the end of the start impulse, one of the projections 12 which is shown on the drawing as being opposite the zero point on scale A, will be at the zero point on scale A', while another of the projections 12, shown on the drawing as being between divisions 1 and 2 on the disc, will be at the zero point of scale A. If the first selecting impulse of the received signals is a mark, relay 16 will be operated to its marking, or left, contact and relay 21 will be operated to its marking, or lower, contact. When the armature of relay 21 leaves its spacing, or upper, contact, a voltage will be induced in the secondary winding of spark coil, or transformer, 28, due to the interruption of its primary circuit and a spark will occur in the vicinity of the zero point on scale A. If no distortion is present at the beginning of selecting impulse No. 1, the spark will occur at the zero point of the scale A. If this selecting impulse begins too soon, the spark will occur on the positive, or left, side of the zero and if it begins too late, the spark will occur on the negative, or right side. The position of the spark with respect to the zero line is, therefore, an indication of the distortion present.

As indicated above, a spark will occur at segment 13 whenever the incoming signal impulses change from spacing to marking and at segment 14 whenever the incoming signal impulses change from marking to spacing. In this way the distortions at the two ends of a marking impulse may be observed separately. As stated above it should be noted that a spark occurs only when the armature of the spark control relay leaves either one of its contacts and that no spark occurs when the armature reaches a contact. This is a well known phenomenon in spark coil operation and is due to the fact that the rate of change of current in the primary winding is much greater when the circuit is opened than when it is closed. Consequently, a much higher voltage is induced in the secondary winding for the former condition than for the latter.

Because of the large number of sparks which occur in a given length of time, the effect will be that of a continuous streak of light at the position of the most frequent distortions and more or less flickering streaks of light where the distortions are not so frequent. The positions of the two streaks of light with respect to the scales A and A' respectively, shown on segments 13 and 14, give a fairly good idea of the nature of the distortion present in the signals. If the sparks occur in the positive region of both segments, it indicates positive bias and if in the negative region it indicates negative bias. The presence of fortuitous or characteristic distortion tends to increase the length of the streak of light due to the fact that successive distortions are not equal and, therefore, cause the sparks to occur at different places. Fortuitous and characteristic distortion are defined in detail in an article entitled "Measurement of Telegraph Transmission" by H. Nyquist, R. B. Shanck and S. I. Cory, published in A. I. E. E. Journal, Volume 46, 1927, page 367. A better idea of the appearance of the streaks of light caused by different kinds of distortion will be hereinafter given.

Referring to Fig. 2 which shows a modification of the arrangement of Fig. 1 and which is the preferred arrangement only one distortion indicating segment is provided in place of the two segments 13 and 14, shown in Fig. 1, so that sparks corresponding to the beginning and to the ending of an incoming marking impulse are caused to be superposed. Also the modified arrangement provides for an alarm device whereby an alarm may be given whenever the distortion exceeds some predetermined value. The operation of the arrangement of Fig. 2 is similar to that of the arrangement of Fig. 1. In these two figures like reference characters represent like parts. The operation of spark control relay 21 causes condenser 60 to be charged suddenly to the positive voltage of battery $B_1$ through the primary winding of spark coil, or transformer, 50 whenever the relay armature travels from its marking, or lower contact to its spacing, or upper contact, and to the negative voltage battery $B_2$ whenever it travels from its spacing to its marking contact. The induced voltage in the secondary winding of spark coil 50 causes a spark to occur between the distortion indicating segment 71 and the projections 12 on the start-stop disc 11. Segment 71 which is equal in length to the time interval of a dot impulse, is divided into three angular sections $71^1$, $71^2$ and $71^3$, the middle section $71^2$ having a length equal to about 40% of the dot impulse interval and the two end sections $71^1$ and $71^3$ each having a length equal to about 30% of the dot impulse length. If the distortion is less than about 20%, the sparks will occur between the projections on the disc and the middle section $71^2$ of segment 71, namely in the vicinity of the zero point. If the distortion exceeds 20%, the spark will occur between the disc and one of the outer sections $71^1$ and $71^3$ of segment 71, causing a voltage drop to be produced across the resistance 52. This drop in voltage is applied to the input of a detector circuit 53 by means of a transformer 54 and thereby causes a momentary operation of relay 55, which operates to close an operating circuit for alarm device 56. The device 56 may be arranged to give a momentary alarm or else a continuous alarm by providing any suitable locking or slow-release relay arrangements well known in the art.

The detector circuit 53 preferably comprises a thyratron or similar gas discharge tube, and the voltage drop produced across resistance 52 causes the tube to flash over and operate the alarm device 56 which may be a bell whose windings are connected into the plate circuit of the tube. The discharge through the tube may be stopped in any well known manner, as for example, by causing the operation of the bell to open the plate circuit of the tube by means of a contact (not shown) connected in series with the plate, bell winding and plate battery.

Since it is sometimes difficult to determine the nature of the distortion when the distortions at the beginning and the end of the marking signals are superposed, keys 57 and 58 are provided for obtaining these distortions separately. These keys are provided to insert resistances $r_1$ or $r_2$ in series with the contacts of spark control relay 21 thereby decreasing the rate of charging of condenser 60 to an extent such that the induced voltage in the secondary winding of the spark coil will be insufficient to produce a spark. If key 57 is opened, sparks will occur only when the incoming signal impulses change from spacing to marking, namely, at the end of the spaces. Similarly, if key 58 is opened, sparks will occur only at the end of the marks. Consequently, the maximum amount of distortion present in the signals may be observed very quickly by superposing the distortions at the ends of the signal impulses and analyzed, if necessary, with the aid of keys 57 and 58.

The three sections of segment 71 have fixedly attached thereto the fluorescent substance D', D" and D"', respectively, and the graduated scales C', C" and C"', respectively, whereby the position of the sparks may be readily determined. Should the incoming signals be undistorted the sparks would occur at the zero point on scale C", should the distortion be positive in excess of 20% and less than 50% the spark would occur at some point along scale C', and should it be negative in excess of 20% and less than 50% the spark would occur at some point along scale C"'.

Referring to Fig. 3, an optical arrangement may be applied to the distortion indicating arrangements shown in Figs. 1 and 2 for observing the distortions at a short distance from the indicating arrangement employed, and also for making a photographic record of the variations in distortions. In the arrangement shown in Fig. 3, a lens 73 is used for projecting the position of the sparks on a ground glass screen 75. A mirror 74 is also used in the optical system to reflect the image at right angles onto the screen 75. A distortion scale may be associated directly with the ground glass screen 75 or a scale C on the distortion indicating segment 71 may be illuminated by means of a lamp 72 and projected by means of lens 73 and mirror 74 on the ground glass screen 75 along with the sparks.

In order to make a permanent record of the variations in distortion, a moving photographic film or paper 76 may be substituted for the ground glass screen 75. The photographic film or paper is indicated on the drawing by two spools 77 and 78, spool 77 being revolved by motor 79 to wind up the exposed film or paper while spool 78 holds the unexposed film or paper.

Referring to Fig. 4, the appearance of sparks or flashes for various types of distortion is shown with respect to the calibrated scales A, A', and C. The flash indications under A correspond to the beginning of a mark, those under A' correspond to the end of a mark, as given by the arrangement shown in Fig. 1. The flash indications under C show the superposed distortions as given by the arrangement shown in Fig. 2. It will be noted that the only information which is given by A and A' and not by C is whether the bias is positive or negative. However, this may be modified considerably in practice due to the effects of distortion on the start impulse.

What is claimed is:

1. A signal distortion indicator comprising a source of signal impulses of different character, a relay responsive to the signal impulses of said source, an intermittently rotatable member and driving means therefor operating in substantial synchronism with the signals received by said relay, a plurality of electrodes on said member, a plurality of stationary members arranged in an arc concentric with the axis of said rotatable member and disposed to form spark gaps with each of the rotating electrodes in turn, circuit means responsive to changes in the character of said signal impulses for momentarily producing a spark across a gap formed by one of the segments and one of the electrodes at the time the change in signal character occurs, a fluorescent substance positioned in said spark gap, whereby an instantaneous spark occurring in said spark gap is prolonged by said fluorescent substance, and means comprising a fixed point and fixedly attached to said stationary members for indicating the position of the prolonged spark with respect to said fixed point whereby the percentage of distortion in a received signal impulse may be readily determined.

2. A signal distortion indicator according to claim 1 wherein the fluorescent substance is coated on a member of porous material which is positioned in said spark gap in a line concentric with said stationary member whereby a spark occurring in said spark gap is arranged to penetrate said member.

3. In a start-stop signaling system, a distortion indicator comprising a source of signal impulses of marking and spacing character, a relay responsive to the signal impulses of said source, a start-stop rotatable member arranged to start in response to the first impulse of a signal combination and to stop in response to the last impulse of the combination, a plurality of projections on said rotatable member, a plurality of stationary members arranged in an arc concentric with the axis of said rotatable member and disposed to form a spark gap with each of the rotating projections in turn, circuit means responsive to changes in character of said signal impulses for momentarily producing a spark across a gap formed by one of said segments and one of said projections at the time the change of signal character occurs, and selective means in said circuit means for producing the spark at the beginning of the marking impulses or at the beginning of the spacing impulses, as desired.

4. In a start-stop signaling system, a distortion indicator according to claim 3 wherein the circuit means comprises a single path selectively operating between two current sources for producing the spark at the beginning of the spacing impulses and at the beginning of the marking impulses.

5. A signal distortion indicator comprising a source of signal impulses of different character, a relay responsive to signal impulses of said source, a rotatable member and driving means therefor operating in substantial synchronism with the signals received by said relay, a plurality of projections spaced around the periphery of said member distances corresponding to the time length of the impulses of said signal combination, a plurality of stationary members arranged in an arc concentric with the axis of said rotatable members and disposed to form a spark gap with the rotating projections, circuit means responsive to changes in the character of said signal impulses for momentarily producing a spark across a gap formed by one of the segments and one of said projections at the time the change in signal character occurs, and an alarm device included in said circuit means for giving an alarm every time a spark occurs across the gap between certain of said segments and said projections.

6. In a start-stop signaling system, a distortion indicator according to claim 3 wherein the circuit means comprises a single conductor, high voltage output circuits inductively connected at one end to alternate sources of current and conductively connected at the other end to a plurality of parallel paths which are respectively connected to said plurality of stationary members.

JOSEPH HERMAN.